United States Patent

Heyes et al.

[11] Patent Number: 5,318,648
[45] Date of Patent: Jun. 7, 1994

[54] LAMINATES OF METAL AND POLYESTER FILM

[75] Inventors: Peter J. Heyes; Alison M. Brown, both of Wantage, United Kingdom

[73] Assignee: CMB Foodcan plc, United Kingdom

[21] Appl. No.: 921,400

[22] Filed: Jul. 30, 1992

Related U.S. Application Data

[63] Continuation of Ser. No. 634,195, Jan. 17, 1991, abandoned.

[30] Foreign Application Priority Data

Jun. 8, 1989 [GB] United Kingdom ............... 8913222

[51] Int. Cl.⁵ .................. B29C 47/00; B28B 11/16
[52] U.S. Cl. .................... 156/244.24; 156/69; 156/244.11; 156/282; 156/308.2; 156/309.9; 264/145; 264/153; 264/163; 264/280
[58] Field of Search ............ 428/458, 475.2, 483, 428/621, 626; 156/69, 244.11, 282, 308.2, 309.9, 244.24

[56] References Cited

U.S. PATENT DOCUMENTS 4,272,475 6/1981 Chi ................... 264/210.1
4,957,820 9/1990 Heyes et al. ........... 428/623

FOREIGN PATENT DOCUMENTS 0312304 4/1989 European Pat. Off.

Primary Examiner—Paul J. Thibodeau
Assistant Examiner—H. Thi Lê
Attorney, Agent, or Firm—Burns, Doane, Swecker & Mathis

[57] ABSTRACT

A laminate and a process for making a laminate of aluminum or aluminum alloy and a polyester. The process includes forming a laminate by contacting an aluminum or aluminum alloy sheet or foil with a film of polyester at a temperature and pressure sufficient to adhere the film to the sheet or foil, reheating the laminate to a temperature above the crystalline melting point of the polyester, cooling the laminate at a cooling rate controlled to prevent crystallization of the polyester, and quenching in water such that the molecular weight of the polyester layers in the laminate is between 14,000 and 23,000.

18 Claims, 2 Drawing Sheets

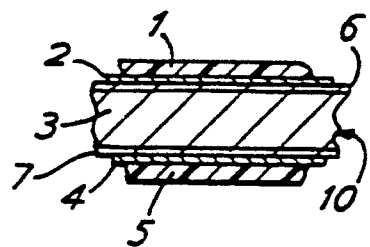
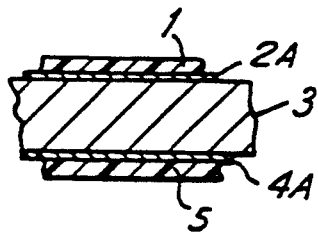
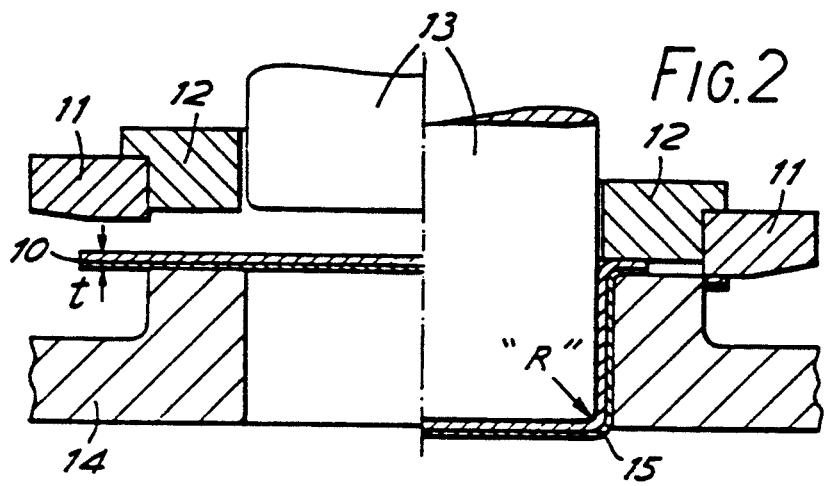
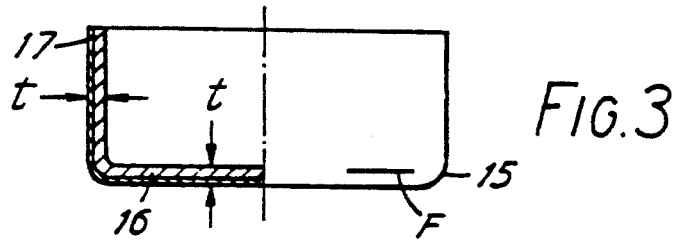
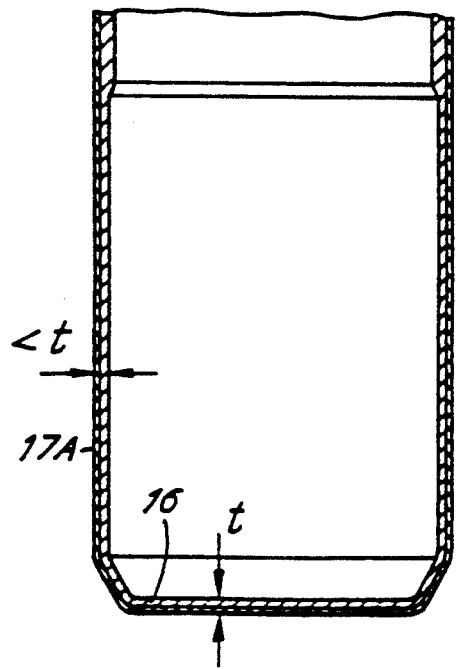

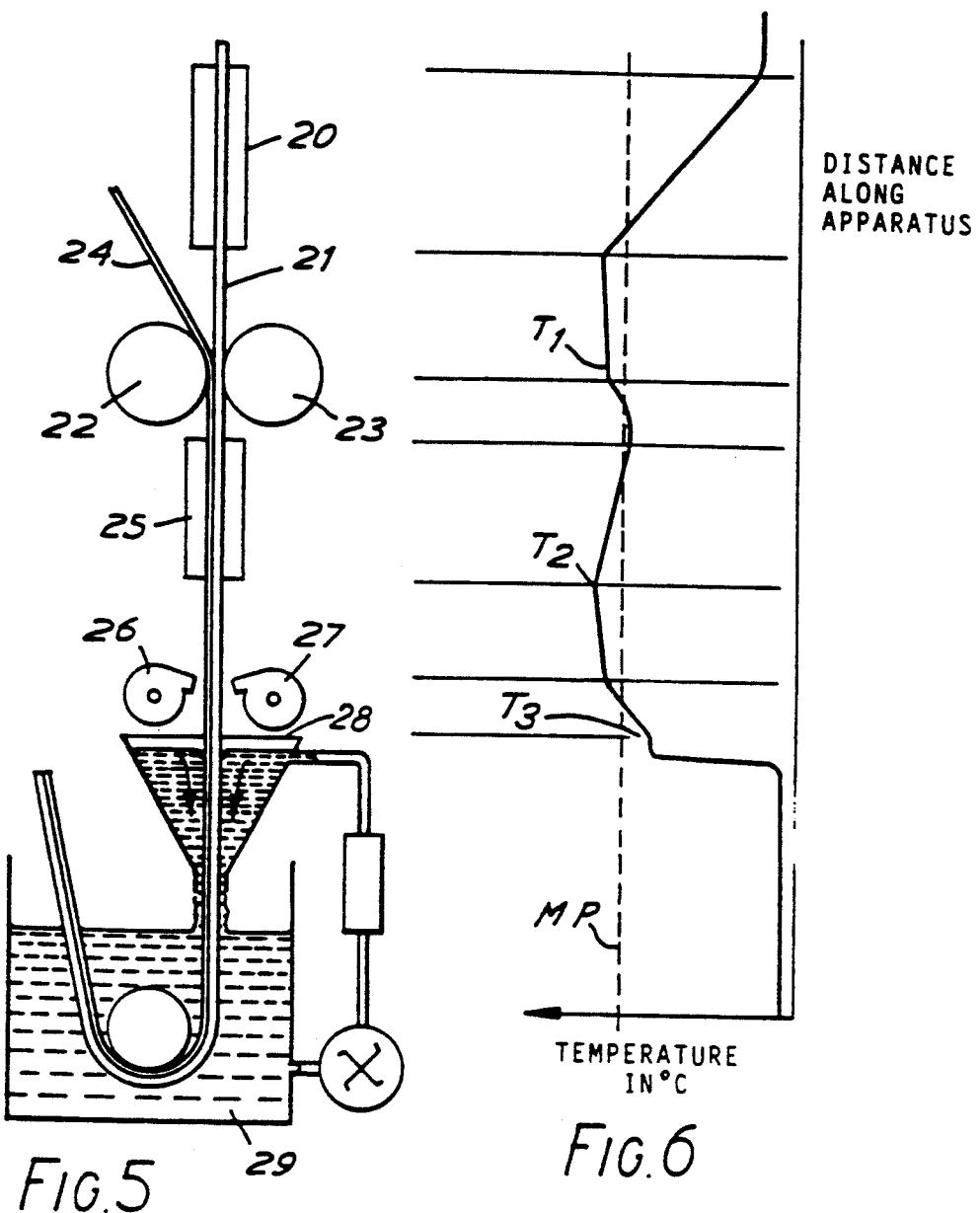
FIG. 5
FIG. 6
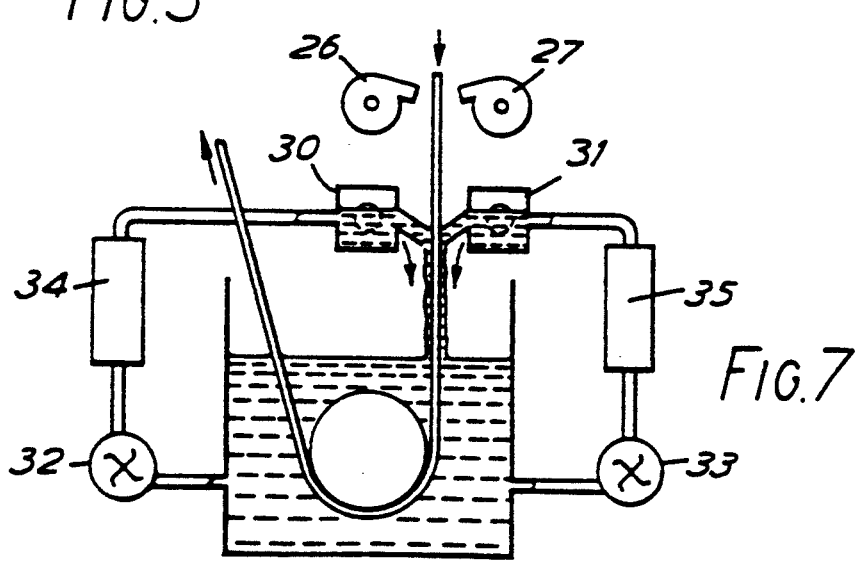
FIG. 7

LAMINATES OF METAL AND POLYESTER FILM

This application is a continuation of application Ser. No. 07/634,195, filed Jan. 17, 1991, now abandoned.

This invention relates to laminates of sheet metal or foil and a polyester film, a method for preparing such laminates and hollow vessels drawn from the laminates.

Our copending European Patent Application Published No. 0312304 describes laminates of sheet metal and polyester film for use in the manufacture of can bodies formed by drawing and wall ironing. A lamination process is described in which a thermoplastic linear polyester film is laminated onto the surface of hot metal sheet by passage between rolls. In the lamination process described the metal is first heated to a temperature sufficient to achieve at least partial adhesion and fully intimate contact of the polyester to the metal as they pass between the rolls. The resultant laminate is then reheated to a temperature above the melting point of the polyester and thereafter quenched rapidly. The process permits lamination of polyesters in the oriented or non-oriented state, be they monolayers or a coextrusion of two polyesters.

We have observed that, whilst the laminating process described in our EP-Al-0312304 can produce useful laminates of aluminium and polyester film in an amorphous form; polyester films of lower molecular weight sometimes fracture during drawing of the laminate into the form of a hollow vessel such as a shallow can. The site of fracture of these polyester films on the annular portion of arcuate cross-section which forms the can bottom to its side wall.

The fracture is typically in the form of a crack which extends along the annular portion and transverse to the tensile forces arising in an axial direction as a punch enters a die to draw a cup. If the drawn cup is placed on a punch and pushed through one or more wall ironing dies the crack or fracture, typically several microns wide, in the polyester film, is widened substantially and the coating's protective properties are lost.

U.S. Pat. No. 4,272,475 teaches the use of a polyester resin of molecular weight 12,000 to 20,000 for producing a sheet and subsequently forming shaped articles such as a helmet. It does not recognise that polyester resins degrade in molecular weight in both extrusion and water quenching from the molten state. Without careful control of these processes the molecular weight falls and the fall can be dramatic from about 25,000 in the resin to below 9,000 in the coated form after thermal lamination and water quenching. At molecular weights below about 13,000, the polyesters are brittle and do not form successfully in a cupping press. The selection of polyester resin of molecular weight alone as described in U.S. Pat. No. 4,272,475 is insufficient to achieve a laminate of polyester film and sheet metal by thermal lamination, suitable for drawing of a cup.

U.S. Pat. No. 4,272,475 teaches that it is possible to form articles from crystalline polyester sheet but we have observed that any crystallinity in the polyester coating produces a laminate unsuitable for deep drawing and wall ironing into cans.

Gel permeation chromatography was used to determine the molecular weight of various polyester films compared to polystyrene standards before and after lamination to an aluminium substrate. Judging from cups drawn from the laminates it became apparent that polyesters of higher molecular weight are resistant to cracking during the deep drawing process.

In a first aspect this invention provides a laminate of aluminium or aluminium alloy sheet or foil and a film of linear polyester characterised in that the polyester is in the form of an amorphous coating, has a molecular weight of at least 14,000 as measured by gel permeation chromatography.

In a preferred embodiment the polyester film of the laminate has an intrinsic viscosity between 0.4 and 1.0 as measured by gel permeation chromatography.

Laminates according to the invention are particularly suitable for drawing into cup shaped vessels which may, if desired, be wall ironed to increase the length of the side wall of the cup shaped vessel.

The aluminium or aluminium alloy sheet or foil may be a commercially pure aluminium or alternatively an alloy such as the manganese/magnesium/aluminium alloy such as alloy No. 3004 (having at least 95.55% by weight aluminum, 1 to 1.5% by weight manganese, and 0.8 to 1.3% by weight magnesium) or 3104 (having at least 95.6% by weight aluminum, 1 to 1.5% by weight manganese, and 0.8 to 1.3% by weight magnesium) in for instance H19 temper is used for can bodies, or alternatively aluminium magnesium alloy such as 5182 (having at least 95.2% by weight aluminum, 0.2 to 0.5% by weight manganese, and 4 to 5% by weight magnesium) which is used for can ends. Alternative aluminium alloys/or can ends include alloy 5042 (having at least 94.15% by weight aluminum, 0.2 to 0.5% by weight manganese, and 3 to 4% by weight magnesium) or alloy 5182. The sheet or foil may if desired have the natural oxide or a passivation layer or preferably a surface treatment in the form of a chromium/phosphate of which there are known commercial passivation treatments or alternatively an anodised oxide, such as phosphoric acid anodised.

In simple embodiments the laminate has a polyester film coating chosen from materials conforming to the general formula:

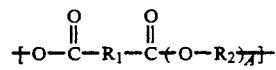

in which R1 is a divalent hydrocarbon group at least 60 mole % of which consists of p-phenylene group, R2 is divalent hydrocarbon group at least 60 mole % of which consists of —C$_2$H$_4$-groups with A=1, A is an integer, applied as a film to the metal substrate. The film may be as cast film, or alternatively as a cast and tenter oriented film, or a blown film.

In one embodiment, the preferred polyester film is a monolayer film with a melting point in the range 200° C. to 260° C. The additional diol such as polyester may be diethylene glycol. The film may be oriented, oriented and crystalline, cast unoriented or blown. If oriented, the film orientation will typically be produced by drawing in the machine and transverse directions by typically 3 to 4 fold after casting. The crystallinity content of the film is typically 5% to 50%.

In another embodiment the polyester film is applied as a coextruded film comprising a layer of polyester such as polyethylene terephalate and a layer of copolyester of lower melting point and higher comonomer content, typically chosen from a group consisting of a copolyester of ethylene glycol and terephthalic acid and isophthalic acid; terephthalic acid and ethylene glycol and diethylene glycol; and terephthalic acid and ethylene glycol and cyclohexane dimethanol, said chosen copolyester serving to bond the polyethylene terephthalate to the aluminium or aluminium alloy substrate.

The outer polyester layer, may be oriented or oriented and crystalline whilst in the film form, but it is desirable that the copolyester layer be amorphous.

Achievement of this desired amorphous quality in the polyester layer or the copolyester layer if present is achieved by control of the temperatures in the film heat setting processes.

The entire polyester coating after lamination must be in an amorphous condition. Apparatus for achieving this condition are described in our EP-A1-0312304.

Accordingly, in a second aspect this invention provides a method for laminating an aluminium or aluminium alloy, in sheet or foil form, to a polyester film by influence of heat and pressure, characterised by providing polyester film having a molecular weight of at least 14,000, laminating the film to the sheet or foil at a temperature T1 to adhere the film to the sheet or foil and achieve intimate contact, reheating the laminate to a temperature T2 above the crystalline melting point of the polyester, and thereafter controlledly cooling the laminate in the dry condition to a temperature T3 before final rapid quenching in water such that the molecular weight of the polyester coating is at least 14,000. The actual values of temperatures T1, T2 and T3 depend on the properties of the polyester and metal surface condition chosen but T1 will be above the effective melting point of the polyester typically above about 280° C. for a highly oriented crystalline PET monofilm melting at 260° C., or between 140° C. and 280° C. for a coextruded highly oriented PET film containing suitably formulated copolyester layers. T2 will be typically in the range of 10° C. to 80° C. above the melting point of the outer polyester, i.e. 240° C. to 330° C. and T3 will typically be above 200° C. to prevent crystallisation of the polyester and ensure the polyester and metal surface interact adequately, but below about 300° C. Temperatures T2 and T3 are measured by pyrometer typically measuring the emitted radiation of wavelength about 7-9 microns.

In preferred embodiments of the method the polyester film is applied to both sides of the aluminium or alloy sheet or foil as either a single layer of polyester or a coextrudate of two polyester layers. The lower melting point co-polyester layer is applied to the major surfaces of the metal to adhere the film to the metal. In this case the temperature T1 is related to the properties of the copolyester layer which, is preferably amorphous.

Various embodiments will now be described by way of example and with reference to the accompanying drawings in which:

FIG. 1A is an enlarged sectioned side view of a laminate of aluminium alloy and polyester film;

FIG. 1B is an enlarged sectioned side view of a laminate of a surface treated aluminium alloy and polyester film.

FIG. 2 is a diagrammatic view of a press tool, for blanking and drawing a cup, showing open and closed positions.

FIG. 3 is a sketch of the cup showing the location of a fracture in the polyester film.

FIG. 4 is a sectioned side view of a wall ironed can.

FIG. 5 is a diagram of laminating apparatus used to make the laminate of FIG. 1A or 1B.

FIG. 6 is a graph showing the temperature of the materials of the laminate along the apparatus of FIG. 5; and FIG. 7 shows our alternative apparatus having a pair of weirs.

In FIG. 1A the laminate comprises a first polymeric film 1 of a polyester such as polyethylene terephthalate (PET) typically 10 microns in thickness; a co-polyester intermediate layer 2 which is typically 2 microns thick; a layer 3 of aluminium alloy such as alloy No. 3004 of thickness typically 300 microns; a second intermediate layer 4 of co-polyester of similar thickness to the first intermediate layer, and a second polymeric film 5 of PET of similar thickness to the first polymeric film. The layer 3 of aluminium is shown as having surface treatment layers 6, 7 which are desirable. If present, the surface treatment may be a mixed chromium-phosphate or alternatively an anodic oxide such as a phosphoric acid anodised oxide.

The copolyester intermediate layers 2 and 4 may be a copolyester of isophthalate-terephthalate-ethylene glycol or alternatively terephthalate-ethylene glycol-diethylene glycol in the amorphous state. The intermediate co-polyester layers 2 and 4 are not always necessary.

If desired the first and second films 1, 5 may be pigmented with titanium dioxide and may if desired be as thick as at least 25 microns.

In FIG. 1B the laminate comprises a first polyester film 1, typically 8 to 12 microns in thickness; a layer 3 of aluminium alloy such as No. 3004 of thickness typically 300 microns; a second polyester layer 5 typically similar to layer 1 or of different thickness or pigmented with for example titanium dioxide. The layer 3 of aluminium is shown having surface treatment layers $2^A$ and $4^A$ typically a mixed chromium phosphate or an anodic oxide typically derived from anodising in phosphoric acid. The surface treatment layers are typically in the thickness range 10 to 100 nanometers.

The laminate of FIGS. 1A and 1B are used to make containers by drawing between a punch and die shown in FIG. 2. In FIG. 2 a blanking and drawing tool comprises a cutting ring 11, a blank holder 12, a punch 13, and a die 14. The punch 13 has a nose radius R typically 3 mm but in a range of 2 to 6 mm can be used. As can be seen from the right hand side of FIG. 2, during passage of the punch 13 into the die 14 the trailing edge of the cup is restrained by pressure exerted by the blank holder 12 acting against the top face of the die. Motion of the punch 13 into the die 14 therefore imposes a tensile force on an annulus 15 of cup material at the punch radius.

FIG. 3 shows a drawn cup 34 mm tall by 90 mm wide produced from the blank 140 mm diameter by the tool of FIG. 2. By application of appropriate blank holder load and choice of suitable clearance between the punch and die, the cup has been given a bottom wall 16 and side wall 17 which are substantially equal in thickness, denoted "t", to the thickness of the blank for example 345 microns overall. However, we have observed that laminates of aluminium and polyester films of relatively low molecular weight are susceptive to cracking of the polyester film at the annulus of arcuate cross section 15 which joins sidewall 17 to bottom wall 16. In the table which follows this crack is tabulated as CRF (cup radius fracture) one such crack F is shown in FIG. 3 to extend around the annulus as an elongate fracture typically, 10 microns wide.

FIG. 4 is presented to show that the side wall of the cup of FIG. 3 can be pushed through a die by a punch to elongate and thin the sidewall 17A. Whilst the metal and polyester of the sidewall survive intact any crack at the cupwall radius R becomes enlarged and the wall ironed container is unacceptable for use.

In the following table the susceptibility of various laminates to cracking during a cup forming trial is shown in terms of initial molecular weight of film, molecular weight after lamination and quality of cups formed

TABLE 1

Properties of Polyester Coated Aluminium

| | Polyester Film | | Laminated Polyester | | |
|---|---|---|---|---|---|
| Example | Type | Molecular Weight | Structure | Molecular Weight | Properties Formability |
| 1 | BO | 17890 ± 1230 | Amorphous | 10780 ± 510 | Severe CRF |
| 2 | BO | 17890 ± 1230 | Amorphous | 12410 ± 1120 | Severe CRF |
| 3 | BO | 17890 ± 1230 | Amorphous | 12530 ± 810 | Moderate CRF |
| 4 | BO | 17890 ± 1230 | Amorphous | 14590 ± 580 | No CRF |
| 5 | BO | 17890 ± 1230 | Amorphous | 16320 ± 840 | No CRF |
| 6 | C1 | 27950 ± 1220 | Amorphous | 22390 ± 680 | No CRF |
| 7 | C2 | | Amorphous | — | Severe CRF |
| 8 | BO | 17890 ± 1230 | Amorphous | 17800 ± 800 | No CRF, Poor Adhes. |
| 9 | BO | 17890 ± 1230 | Amorphous | 17920 ± 930 | No CRF |
| 10 | BO1 | 20500 ± 1280 | Amorphous | 19730 ± 1380 | No CRF |
| 11 | BO2 | 20760 ± 610 | Amorphous | 20030 ± 630 | No CRF |

Notes
1. Film Type
BO represents biaxially oriented PET coextruded film, comprising 12 microns of crystalline, oriented PET and 3 microns of amorphous copolyester
C1 represents cast PET, coextruded film, comprising 20 microns of nonoriented PET and 5 microns of copolyester, both polyesters amorphous.
BO1 represents a biaxially oriented polyester monolayer film of thickness 12.5 microns, melting point 235° C. and crystallinity >35%
BO2 represents a biaxially oriented polyester monolayer film of thickness 13 microns melting point 235° C. and crystallinity <10%
C2 represents cast polycarbonate, coextruded film, comprising 15 microns of polycarbonate and 15 microns of copolyester of terephthalic acid ethylene glycol and cyclohexanedimethanol.
2. Formability
CRF: Cup Radius Coating Fracture causing severe lower can slide wall coating failure.
Adhesion: Presence of delamination from the trimmed 12 fluid ounce DWI can (211 diameter × 413 tall - approx 65 mm × 130 mm tall) with an 0.190 mm thick wall, during washing.

The analyses tabulated above, of the molecular weights of polyester film and laminated coatings by gel permeation chromatography (GPC) have shown that the performance, during drawing a cup, of the laminated coating is related to its molecular weight.

From the examples listed in Table 1 we conclude that: Examples 1 and 2 illustrate the sever coating fracture associated with low molecular weight of film in the laminated coatings. Example 3 an intermediate failure mode and Examples 4 and 5 no coating fracture, all form identical starting film. The differences in molecular weight reduction derive from lamination conditions, not just T2 but the combination of T2 and the conditions of quenching. Example 6 illustrates an alternative type of polyester resin and film manufacturing technique, giving a higher film molecular weight.

Example 7 illustrates that the phenomenon is not restricted to polyester. A fully amorphous polycarbonate-based film demonstrates the same type of brittle fracture.

Comparative Examples 1, 8 and 9 demonstrate a separate feature, that of process control and its relationship with coating performance. From Examples 1 to 5 and their reheating temperature values T2 it would be assumed that retention of molecular weight can be achieved by reducing T2; that was undertaken in Example 8 but resulted in poor coating adhesion on the formed can. Example 9 retained a high T2 as in Example 1 but the laminate was cooled to T3 with an air jet immediately before careful quenching in water where no water was allowed to contact the hot laminate before the main line of quenching.

Example 6 demonstrates that a higher molecular weight film will give a higher molecular weight polyester coating, provided T2, T3 and quenching are under proper control. Higher film molecular weights are advantageous but can be difficult to achieve on some film making equipment and the higher molecular weight resins are more expensive.

Examples 11 and 12 illustrate the use of monolayer polyester films of different crystallinities to product amorphous coatings with adequate molecular weights.

When samples of Example 2 were formed in a cupping tool as shown in FIG. 2. The extent of cup radius fracture was found to depend on the blankholder load, for a fixed radius dimension of 3 mm. The blankholder load introduces inertia to the forming of the laminate under the impact of the punch as the laminate is held on the die by the blankholder. The molecular weight of the coating controls its impact resistance and brittleness but for critical values of impact resistance, the rate of forming on the punch nose radius or the radius value govern the extent of coating fracture.

We conclude that cup radius coating fracture is the brittle fracture of the coating under the impact of the coating molecular weight.

The polyester coatings require a molecular weight of at least approximately 14,000 for adequate formability at 100 strokes per minute in a cupping press with a punch nose radius of 3 mm. Typical commercially available polyester films have a molecular weight greater than 14,000 and typically approximately 18,000 to 20,000. Thermal lamination coupled with water quenching can reduce the polyester molecular weight. Thermal degradation of polyester is well known but it is generally a minor component in degradation at temperatures (T2) up to approximately 320° C. in dry PET when the time at this temperature is under the 2 seconds typical of the process time associated with a commercially viable thermal lamination operation.

The major mechanism for polyester degradation is hydrolytic, demanding the presence of water above the melting point of the polyester and especially if T2 is greater than about 300° C.

FIG. 5 shows diagrammatically apparatus for manufacturing a laminate of metallic sheet or foil and a polyester film. The apparatus comprises a first heater 20 through which the metal 21 passes to become heated. The metal then passes to a pair of pinch rolls 22, 23 at which the influences of heat and pressure combine a film 24 to the metal to make a laminate. The temperature of the metal and film at the pinch rolls is denoted T1 in FIG. 6 which graphically Plots the temperature of the laminate at positions along the apparatus for polyester film as illustrated by Example 10 in Table 1.

Passage through the pinch rolls 22, 23 cools the laminate which is then passed through a second heater 25 to raise the temperature of the laminate to a temperature T2 above the melting point of the film. After passing through the second heater the laminate is cooled by forced air from blowers 26, 27 which reduce the laminate temperature whilst keeping it dry. A typical dry cooling rate is about 50° C. per second.

The cooled dry laminate is then quenched by immersion in a trough 28 of water which falls with the laminate to effect rapid quenching (at a cooling rate typically in a range of 50° to 200° per second). .The laminate dips into a collecting tank 29 from which the cooling water is recirculated, through a heat exchanger 35, to the trough 28.

We have found that the precise conditions of quenching the polyester coated metal are critical.

1. If the polyester cools slowly it crystallises and loses formability.
2. If water contacts the molten polyester before it undergoes rapid quenching, it interacts with polyester causing its molecular weight to fall by a hydrolytic process.

The lamination temperature T2 must be sufficient to melt the polyester, such that it eliminates any crystallinity or orientation in the coating and permits the extent of interaction between polyester and metal to create sufficient sheet adhesion for the laminate to be formed into commercially viable beverage cans. Typically T2 will be 10° C. to 80° C. above the polyester melting point or about 240° to 330° C. for the coating to strip adhesion to be sufficient for adhesion between can wall coating and the can wall metal. A useful aluminium beverage can would have a 0.109 mm ironed side-wall gauge, formed from 0.30 mm gauge 3004 aluminium alloy which typically has a suitable surface conversion coating of for example phosphoric-acid anodised or chromium-phosphate.

At these T2 values it is necessary to control contact between the hot laminate and water. This can be achieved by cooling the laminate with air from T2 to T3 immediately before rapid water quenching such that the entire strip is uniformly cooled. Cooling to T3 should allow sufficient time for the polyester to interact with the metal at about T2 to provide adhesion. The rate of cooling from T2 to T3 must be such as to prevent crystallisation, typically above approximately 50° C. per second and T3 is ideally above approximately 200° C.

If the temperature T2 is too high, typically above about 330° C., polyester degrades by combined thermal and hydrolytic mechanisms, probably involving water originally present in the polyester film. The result can be two-fold:

(1) The molecular weight will fall below 14,000 if the film molecular weight was too low. This can be avoided if the film molecular weight is raised by choice of polyester resin and extrusion conditions: such precautions can reduce polymer scoring in the external coating during formation of the can through the tooling dies.

(2) The aluminium alloy 3004 softens at T2 values above about 230° C. and this softening reduces the strength of the can base. Selection of a different alloy that does not soften at the selected T2 is advantageous and possible because the polyester coatings separate the aluminium from the ironing dies, preventing the galling that the 3004 alloy was chosen to overcome. Higher strength versions of 3004 alloy, with, for example, higher copper and magnesium contents, can be used. The metal softening in lamination will bring the metal's tensile properties into a regime where formability is acceptable and at the same time stabilise the thermal properties of the metal so that, after can forming, the normal print stoving and can drying operations do not reduce the metal strength. The result is to produce a stronger polymer coated container than a conventionally produced can for a given metal gauge.

T2 values must fall within a band set on the lower side by the need to achieve adhesion and on the upper side by degradation. However even within the satisfactory band it is necessary to control the interaction between hot laminate and quench water, hence the benefit in cooling to T3 before rapid quenching.

The graph shown in FIG. 6 is typical of the temperatures arising in apparatus during lamination of a monofilm of polyester to an aluminium substrate. The temperature T1 is shown as being above the melting point of the polyester. If however, a two layer film of an outer polyester and an inner layer of copolymer is laminated to an aluminium substrate the temperature T1 will be above the softening point of the inner copolyester but may be below the melting point of the outer polyester layer.

FIG. 7 shows a modified apparatus in which the laminate passes between blowers 26, 27 and then between a pair of weir boxes 30, 31 in the form of long boxes full of water from which a continuous flow of chilled water emanates across their surfaces to drench the laminate as the water travels shown by arrows with the laminate into a collecting tank 29. Water is pumped by pumps 32, 33 through respective chillers 34, 35 to each weir box 30, 31. Separation of the coolant flow to each side of the laminate permits controlled cooling of the polymeric film on each side of the metal substrate. The direction of air flow with the laminate into the quench can assist in the maintenance of a line quench and prevent the contact of water onto the molten polymer before the main line of quenching.

We claim:

1. A process for laminating aluminum or aluminum alloy to polyester comprising forming a laminate by applying a film of polyester to an aluminum or aluminum alloy sheet or foil having front and back surfaces at a temperature T1 and pressure sufficient to adhere said film to said sheet or foil, reheating said laminate to a temperature T2 above the crystalline melting point of said polyester, uniformly cooling said laminate in the absence of wafer to a temperature T3 below the melting point of the polyester of a cooling rate controlled to prevent crystallization of the polyester, and quenching the laminate in water such that the molecular weight of the polyester layer in the quenched laminate is between 14,000 and 23,000.

2. A process according to claim 1, wherein a polyester film is simultaneously laminated to both the front and back surfaces of the aluminum sheet or foil.

3. A process according to claim 1, wherein said cooling rate is about 50° C. per second.

4. A process according to claim 1, wherein said laminate comprises an aluminum alloy having at least 95.55% by weight aluminum, 1 to 1.5% by weight manganese, and 0.8 to 1.3% by weight magnesium.

5. A process according to claim 1, wherein said laminate comprises an aluminum alloy having at least 95.6% by weight aluminum, 1 to 1.5% by weight manganese and 0.8 to 1.3% by weight magnesium.

6. A process according to claim 1, wherein said laminate comprises an aluminum alloy having at least 94.15% by weight aluminum, 0.2 to 0.5% by weight manganese and 3 to 4% by weight magnesium.

7. A process according to claim 1, wherein said laminate comprises an aluminum alloy having at least 95.2% by weight aluminum, 0.1 to 0.5% by weight manganese and 4 to 5% by weight magnesium.

8. A process according to claim 1, wherein the aluminum alloy has been treated with a surface conversion coating of either chromium-phosphate or anodized phosphoric-acid.

9. A process according to claim 1, wherein the polyester applied to the sheet or foil is polyethylene terephthalate.

10. A process according to claim 9, wherein the polyester applied to the sheet or foil is in the form of an oriented cast film.

11. A process according to claim 10, wherein the layer of copolyester and the outer layer of polyethylene terephthalate are both amorphous.

12. A process according to claim 1, wherein the polyester applied to the sheet or foil is in the form of a blown film or a cast film.

13. A process according to claim 1, wherein the polyester applied to the sheet or foil is in the form of a coextruded film comprising an outer layer of polyethylene terephthalate and an inner layer of copolyester selected from the group consisting of a copolyester of ethylene glycol, terephthalic acid and isophthalic acid; terephthalic acid, ethylene glycol and diethylene glycol; and terephthalic acid, ethylene glycol and cyclohexane dimethanol, and said copolyester adhering the sheet or foil to the outer layer of polyethylene terephthalate.

14. A process according to claim 1, wherein the polyester applied to the sheet or foil is in the form of a biaxially oriented film with a melting point in the range of 200° C. to 260° C.

15. A process according to claim 1, which further comprises the steps of drawing the laminate to a cup-shaped vessel or drawing the laminate to a cup and subsequently wall ironing the cup into a deeper vessel.

16. A laminate of aluminum or aluminum alloy sheet or foil and a polyester made by a process according to claim 1, wherein the polyester in the laminate is in the form of an amorphous layer and has a molecular weight of between 14,000 and 23,000 as measured by gel permeation chromatography, said polyester being directly bonded to the sheet or foil.

17. A laminate according to claim 16, wherein the polyester has the general formula

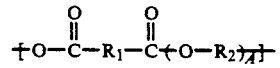

where $R_1$ is a divalent hydrocarbon group at least 60 mole % of which are p-phenylene groups; $R_2$ is a divalent hydrocarbon group at least 60 mole % of which are $-C_2H_4$ groups when $A=1$, and A is an integer for the remaining mole % of $R_2$.

18. A process for laminating an aluminum or aluminum alloy sheet or foil to polyester comprising forming a laminate by contacting an aluminum or aluminum alloy sheet or foil with a film of polyester at a temperature and pressure sufficient to adhere said film to said sheet or foil, reheating the laminate to a temperature above the crystalline melting point of the polyester, cooling said laminate at a cooling rate controlled to prevent crystallization of the polyester, and quenching the laminate in water at a quenching rate int he range of 50° C. to 200° C. per second such that the molecular weight of the polyester layer in the quenched laminate is between 14,000 and 23,000.

* * * * *